R. S. HEDTLER AND M. R. TAYLOR.
VARIABLE DIRECTION PROPELLING APPARATUS.
APPLICATION FILED FEB. 14, 1921.
1,392,763.
Patented Oct. 4, 1921.
5 SHEETS—SHEET 4.
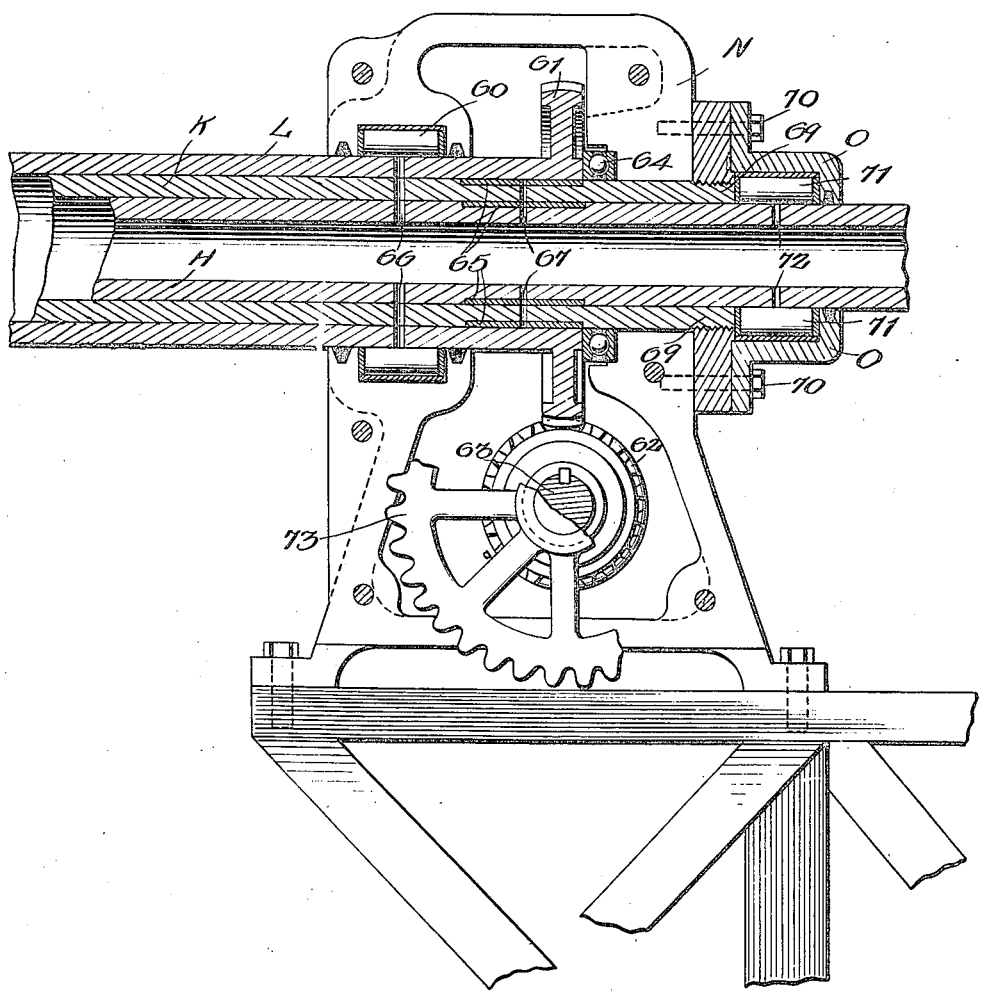
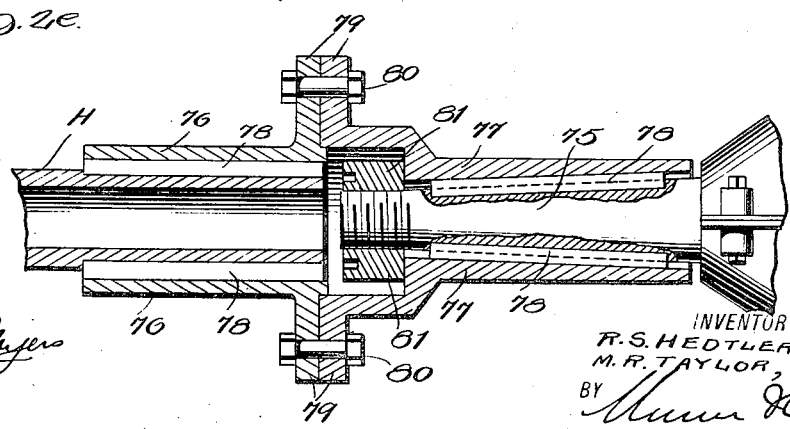

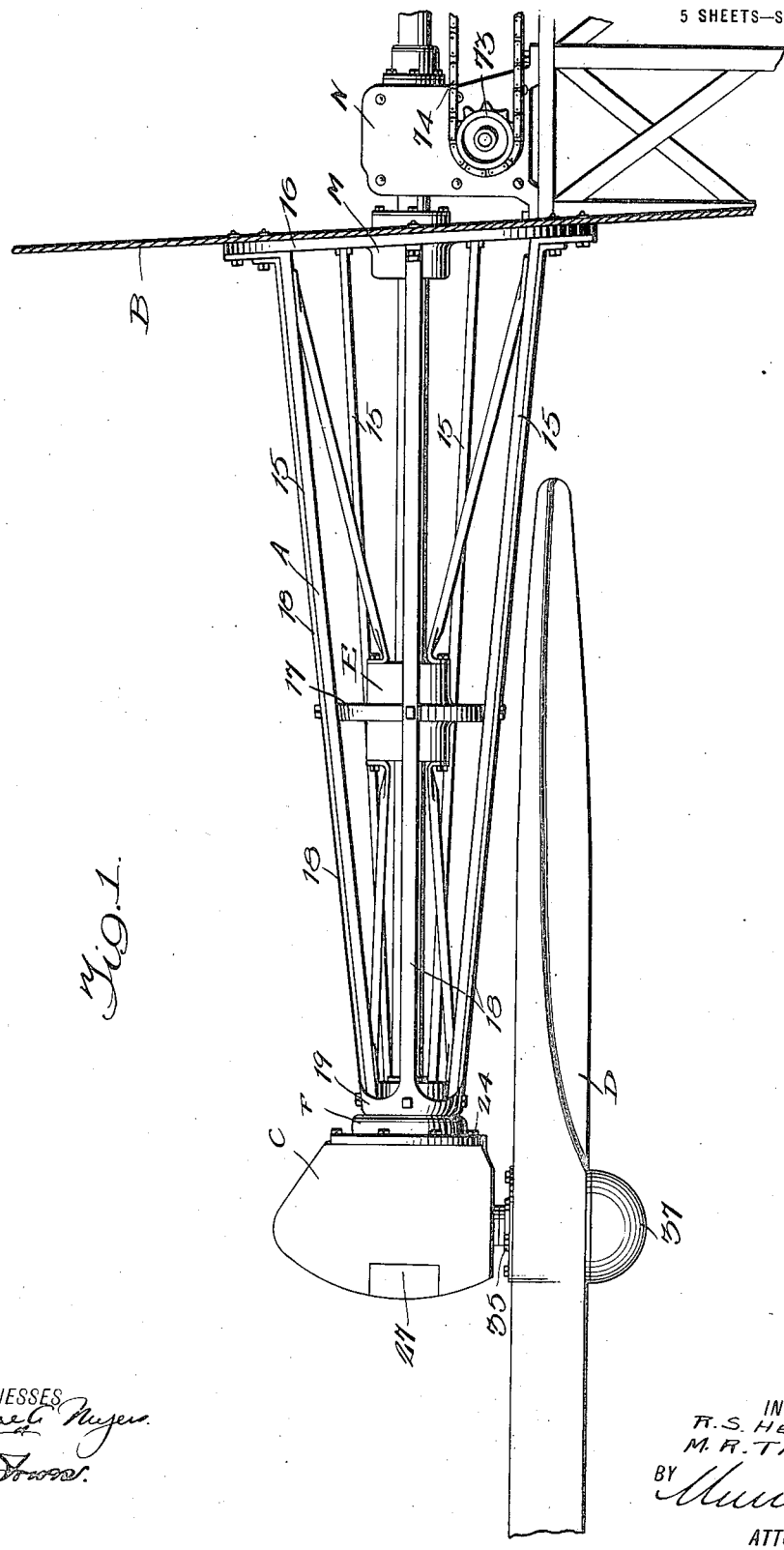

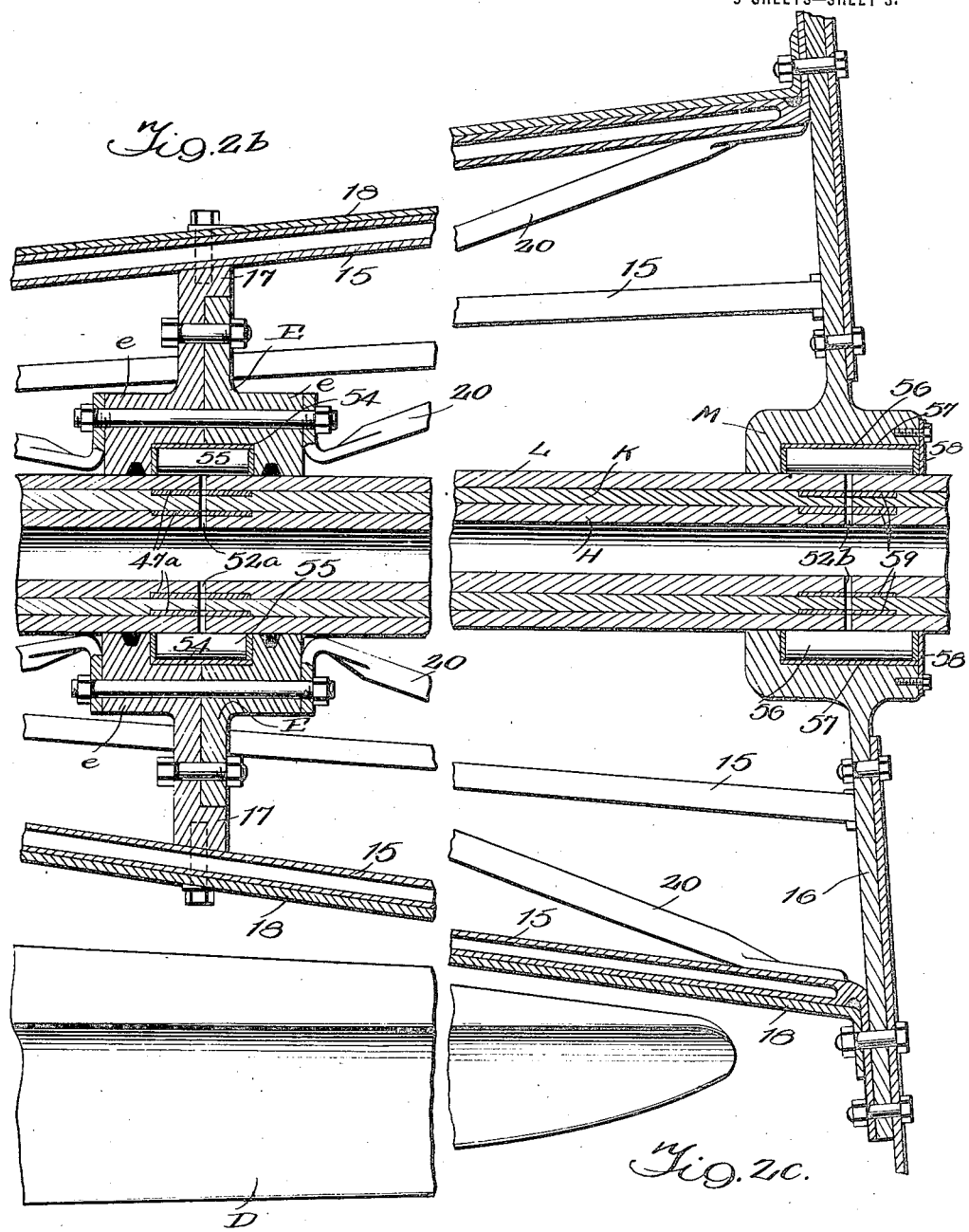

R. S. HEDTLER AND M. R. TAYLOR.
VARIABLE DIRECTION PROPELLING APPARATUS.
APPLICATION FILED FEB. 14, 1921.

1,392,763.

Patented Oct. 4, 1921.

5 SHEETS—SHEET 5.

WITNESSES

INVENTOR
R. S. HEDTLER,
M. R. TAYLOR,
BY
ATTORNEYS

UNITED STATES PATENT OFFICE.

ROBERT STUART HEDTLER AND MILAN RANSFORD TAYLOR, OF NORFOLK, VIRGINIA.

VARIABLE-DIRECTION PROPELLING APPARATUS.

1,392,763. Specification of Letters Patent. Patented Oct. 4, 1921.

Application filed February 14, 1921. Serial No. 444,913.

*To all whom it may concern:*

Be it known that we, ROBERT STUART HEDTLER and MILAN RANSFORD TAYLOR, citizens of the United States, and residents of Norfolk, in the county of Norfolk and State of Virginia, have invented certain new and useful Improvements in Variable-Direction Propelling Apparatus, of which the following is a specification.

Our invention relates generally to propellers for air-ships, aeroplanes and the like, and particularly to a variable direction propelling apparatus which includes one or more propellers having an axis of rotation which may at will be adjusted to occupy various angles for the purpose of directional driving of the air vehicle.

It is the purpose of our invention to provide an apparatus of the above described character in which the adjusting means for causing the propeller to occupy various angular positions is operable independently of the driving means for the propeller so that the propeller can be adjusted to any desired position while it is being rotated.

It is also a purpose of our invention to provide a propelling apparatus which is of comparatively simple and inexpensive construction, reliable and efficient in use, and so designed as to securely maintain all its parts in operative relation and against torsional strains and stresses. Furthermore, our invention provides an apparatus in which the several parts comprised therein are detachably associated with each other to permit of their removal and substitution.

We will describe one form of variable direction propelling apparatus embodying our invention and will then point out the novel features thereof in claims.

In the accompanying drawings:

Figure 1 is a view showing in side elevation one form of propelling apparatus embodying our invention in applied position with respect to the fuselage of an air vehicle.

Figure 2A:
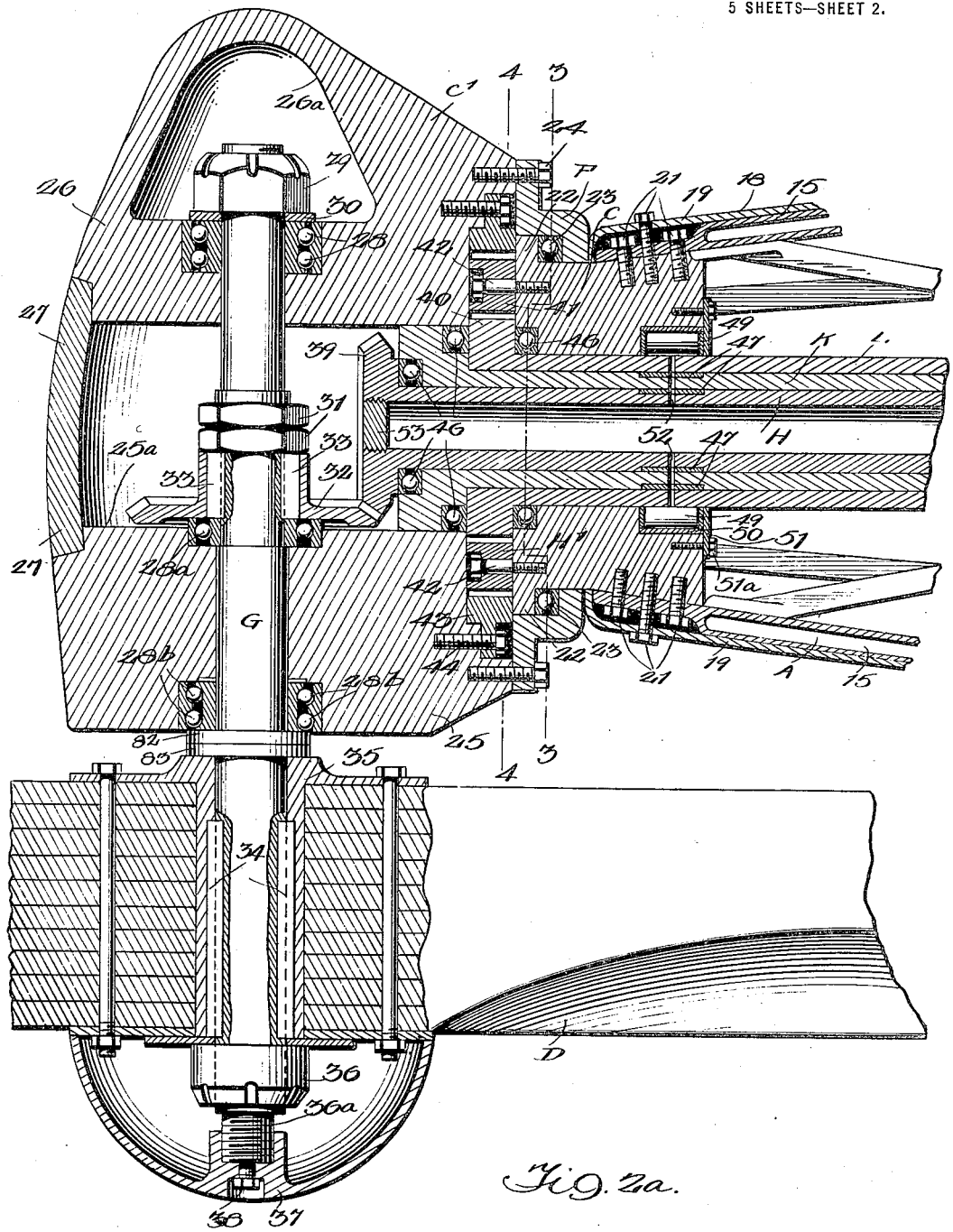

Figs. 2$^a$, 2$^b$, 2$^c$, 2$^d$, and 2$^e$ are views showing in longitudinal section the apparatus shown in Fig. 1.

Figure 3:
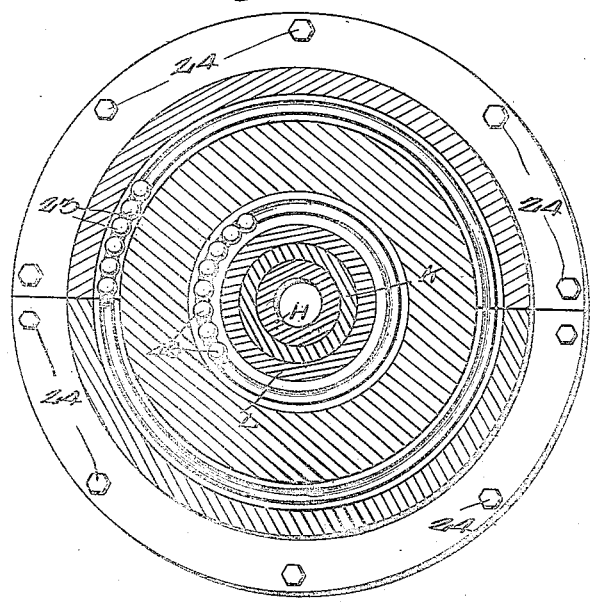
Figure 4:
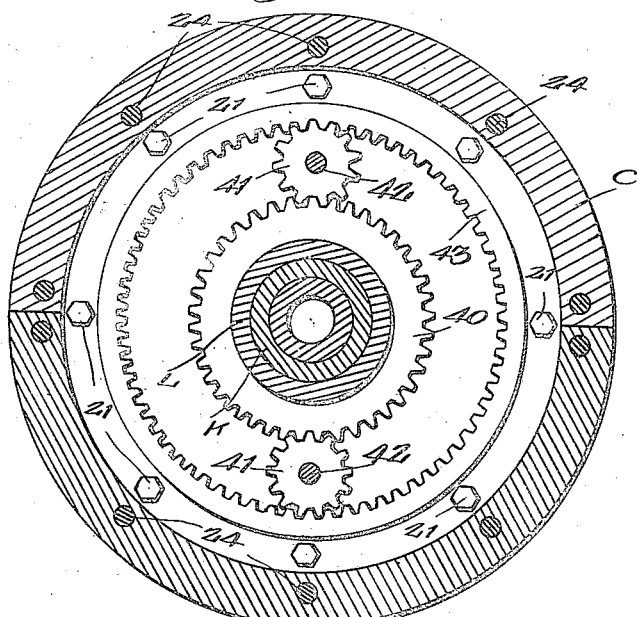

Figs. 3 and 4 are vertical transverse sectional views taken on the lines 3—3 and 4—4, respectively, of Fig. 1.

Similar reference characters refer to similar parts in each of the several views.

Referring specifically to the drawings, our invention in its present embodiment consists of an outrigger designated generally at A which is of substantially conical form with its large end secured at the side of a fuselage B of an air vehicle, and its small end carrying a housing C upon which a propeller D of conventional form is sustained. The outrigger A in the present instance is constructed so as to offer the least possible resistance to the wind and comprises a plurality of longitudinally extending bars 15 which are secured at one end to a plate 16 and at the opposite end to the periphery of the housing C. The bars 15 are connected at a point intermediate their ends by a conical annulus 17 which serves to brace them against lateral bending and to maintain them in convergent relation to each other. Reinforcing and protecting rods 18 overlie the bars 15 with one of their ends secured to the adjacent ends of the bars and their opposite ends terminating in a collar 19 that is bolted to the annulus 16 and to the housing C in the manner clearly shown in Fig. 2$^a$. The annulus 17 constitutes an integral part of a journal box designated generally at E, and as clearly shown in Fig. 2$^b$, this journal box consisting of two separate and independent sections $e$ and $e'$ detachably secured to each other as shown, with the annulus 17 formed on one of the sections. Bracing bars 20 are bolted to the opposite sides of the journal box E and are riveted or otherwise permanently secured at their opposite ends to the bars 15. By this arrangement it will be seen that the bars 20 in addition to serving as braces for the journal box E also reinforce the entire outrigger.

Referring now to Fig. 2$^a$, it will be seen that the housing C consists of a stationary section $c$ and a movable section $c'$ which is mounted for rotation upon the stationary section and is detachably associated therewith by means of a connecting collar F. The stationary section $c$ is secured within the small end of the outrigger A in the manner shown, we having in the present instance provided studs 21 which extend through the annulus 17 and the collar 19 and into the stationary section. In this manner the section $c$ is secured against rotation with respect to the outrigger while at the same time being readily detachable therefrom. The outer end of the stationary section is provided with an annular flange 22 which is embraced by the connecting collar F, with ball bearings 23 interposed between the two. The collar F is detachably secured to the movable section $c'$ by means of the stud bolts 24 so that when it is desired to detach the movable section from the stationary section this can be readily accomplished by removal of the studs 24 from the collar.

As shown in Fig. $2^a$, the movable section $c'$ is constructed to provide a base portion 25 and an intermediate portion 26 spaced from the upper end of the section and from the base portion to divide the section into two compartments designated at $25^a$ and $26^a$. Access may be had to the compartments $25^a$ and $26^a$ through the medium of hand holes 27 and $27^a$. The portions 25 and 26 are bored as shown in Fig. 2 to accommodate a propeller shaft G, and the sides of these portions are recessed to receive ball bearings 28, $28^a$ and $28^b$. The upper end of the shaft G is screw threaded to receive a lock nut 29 beneath which is arranged a washer 30 which overlies the bearings 28 so as to maintain the balls within the raceway. At a point within the compartment $25^a$, the shaft G is threaded to receive two adjusting nuts 31, the lower one of which is adapted to engage the hub of a bevel gear 32 for maintaining the same in definite relation to the adjacent bearing $28^a$. As shown, the shaft G and the hub of the bevel gear 32 are slotted to receive keys 33 for locking the gear to the shaft. The lower end of the shaft G projects beyond the housing and is there slotted to accommodate keys 34 which serve to lock the hub 35 of the propeller D. The lower extremity of the shaft G is provided with a lock nut 36 with a threaded extension $36^a$ to receive a hub cap 37, the latter being retained thereon against accidental displacement by means of a stud bolt 38.

The bevel gear 32 constantly meshes with a similar gear 39 formed on the end of a tubular driving shaft H so that when rotation of such shaft is effected, a rotation of the propeller D is effected through the medium of the bevel gear 32 and the shaft G. Adjusting washers 82 and 83 are used in connection with the adjusting nuts 31 to maintain the bevel gears 32 and 39 in proper mesh and to take up any excessive wear. Loosely embracing the driving shaft H is a tubular axle K, and rotatably fitted upon the axle K is a tubular shaft L. The shaft L is designed to effect a rotation of the movable section $c'$ so as to cause the propeller to occupy various angular positions. To this end the shaft L is operatively connected to the section $c'$ by means of a spur gear 40 formed integral with the adjacent end of the shaft and constantly meshing with a plurality of pinions 41 rotatably mounted on stud bolts 42 carried by the stationary section $c$. The pinions 41 also mesh with a ring gear 43 fixedly secured to the adjacent recessed face of the movable section $c'$ by means of stud bolts 44. By this arrangement it will be seen that upon rotation of the shaft L, a rotation of the spur gears 40 is effected which through the medium of the pinions 41, rotates the ring gear 43 and thus moves the movable section $c'$ about the axle as an axis.

By referring to Fig. $2^a$, it will be seen that these ends of the shafts G and L and the axle K are separated by ball bearings 46 so as to permit of free rotation of the shafts with relation to the axle. Adjacent their ends the shafts and axle are separated by the metallic sleeve bearings 47 disposed in suitable recesses formed in the shaft H and the axle K. Exteriorly of the shaft L at this point, roller bearings 49 are provided which are disposed within a race-way 50 arranged in an annular recess formed in the stationary section $c$. The race-way 50 is retained within the recess by an annular plate 51 secured to the stationary section by stud bolts $51^a$. The shafts H and L, the axle K and the sleeve bearings 47 are all bored transversely to provide ducts 52 through which a lubricant contained within the shaft H can find its way to the roller bearings 49. The lubricant is prevented from leaving the gear end of the shaft by means of a screw threaded plug 53 fitted within the shaft as clearly shown in Fig. $2^a$.

By reference to Fig. $2^b$, it will be seen that the shafts H and L and the axle K extend axially of the outrigger and through the journal box E in a second journal box M. As previously described, the journal box E is made of two sections $e$ and $e'$, and these sections are recessed to accommodate a race-way 54 in which roller bearings 55 are mounted to contact with the shaft L. At this point within the length of the shafts H and L and the axle K, sleeve bearings $47^a$ are provided, and ducts $52^a$ are formed in the same manner and for the same purpose as the ducts 52. The journal box M is formed axially of the plate 16 bolted to the fuselage B and spanning an opening formed therein. The journal box M is provided with roller bearings 56 mounted in a race-way 57 and retained therein by a collar 58. The bearings 56 contact with the shaft L, and at this point the shafts H and L and the axle K are provided with sleeve bearings 59 and with lubricating ducts $52^b$. Referring now to Figs $2^d$, the shafts H and L and the axle K extend interiorly of the fuselage B and into a casing designated generally at N. This casing is bolted to and supported upon the inner frame work of the fuselage and is designed to rotatably receive the shaft L by means of roller bearings 60. The casing N is made up of two sections which are bolted together, each of the sections being suitably formed to accommodate the shaft L, the axle K and the roller bearings 60. The shaft L terminates within the casing N and is there provided with a worm gear 61 that is adapted to mesh with a similar gear 62 keyed to a shaft 63 and journaled in the casing. The end of the shaft L is in abutting relation to a ball bearing 64, and sleeve bearings 65 are interposed between the shafts H and L and the axle K. A lubricant is adapted to be supplied to the roller bearings 60 and to the sleeve bearings 65 through the medium of ducts 66 and 67, respectively.

The axle K terminates at a point just beyond the casing N and is here threadedly engaged by a collar 69 to which is secured a journal box O by means of stud bolts 70. The journal box O contains roller bearings 71 which contact with the driving shaft H and to which a lubricant is supplied by means of ducts 72 formed in the shaft H.

The shaft 63 is adapted to be rotated either manually or by power operated means through the medium of a sprocket 73 about which is trained a chain 74 (Fig. 1) that is adapted to be operatively connected to any suitable power operated means within the fuselage for actuating the shaft.

In Fig. 2ᵉ, the driving shaft H is shown extended and operatively connected to the shaft 75 of a motor. In the present instance, we provide two sleeves 76 and 77 which are fixed to the confronting ends of the shafts H and 75 by means of keys 78. The confronting ends of the sleeves are formed with flanges 79 secured to each other by means of bolts 80. The adjacent end of the shaft 75 is screw threaded to receive a nut 81 and in such manner as to securely retain the sleeve 77 on the shaft 75 against longitudinal displacement.

In the operation of the propelling apparatus, the motor shaft 75 rotates the drive shaft H, and through the medium of the bevel gears 32 and 39, rotation of the propeller shaft G is effected to cause rotation of the propeller D about the shaft G as a center. When it is desired to bodily move the propeller or to shift the axis thereof, so that it will rotate in a different plane, rotation of the movable section c' of the housing C is effected by rotation of the sprocket wheel 73 as will be readily understood from the preceding description. By this mechanism, shifting of the axis of the propeller to any position within the radius of a circle is rendered possible so that when secured in any predetermined position, the propeller can be caused to function to drive the air vehicle to which it is attached in any and all directions, and when a plurality of such propelling apparatus are employed on an air vehicle, it will be manifest that through proper manipulation of the several apparatus a complete vertical and lateral control of the vehicle can be readily effected.

By virtue of the manner in which the shafts H and L are associated with the axle K, it will be clear that the rotational speed of the propeller can be maintained or varied independently of the adjusting means for the movable section of the housing C, and that as a consequence of this arangement the axial shifting of the propeller can be accomplished independently of the driving means for the propeller.

The particular arrangement and construction of the several bearings associated with the shafts and axle constitute an important feature of our invention because as a result of this construction the shafts and axle are securely sustained against all strains and stresses thus insuring the efficient operation of the apparatus at all times.

Although we have herein shown and described only one form of variable direction propelling apparatus embodying our invention, it is to be understood that various changes and modifications may be made herein without departing from the spirit of the invention and the spirit and scope of the appended claims.

What we claim is:

1. A variable direction propelling apparatus comprising, an outrigger, a housing rotatably supported on the outrigger, a propeller shaft journaled in the housing, a propeller fixed to said shaft, a tubular axle supported by the outrigger, a driving shaft rotatably fitted within said axle and operatively connected to said propeller shaft, means for rotating said housing including a shaft journaled on the outrigger and rotatably fitted on said axle, and means for rotating said shaft.

2. A variable direction propelling apparatus comprising, an outrigger, a housing including a stationary section fixed to the outrigger and a removable section rotatably supported upon the stationary section, a shaft journaled in the movable section, a propeller fixed to said shaft, a driving shaft extending through the stationary section and into the movable section, means for operatively connecting the propeller shaft and the driving shaft in a manner to permit the propeller shaft to occupy various angular positions, a third shaft journaled in the outrigger and the stationary section, and means for operatively connecting the third shaft with the movable section to effect rotation of the latter when said shaft is rotated.

3. A variable direction propelling apparatus comprising, a tubular axle, a driving shaft journaled in the axle, a second shaft journaled on the axle, a housing including a stationary section and a movable section, a propeller shaft journaled in the movable section and operatively connected to the driving shaft, and means for operatively connecting the second shaft with the movable section to effect rotation of the latter when said shaft is rotated.

4. A variable direction propelling apparatus comprising, a tubular axle, a driving shaft journaled in the axle, a second shaft journaled on the axle, a housing including a stationary section and a movable section, a propeller shaft journaled in the movable section and operatively connected to the driving shaft, and means for operatively connecting the second shaft with the movable section to effect rotation of the latter when said shaft is rotated, said means comprising, a gear formed on the second shaft, a second gear carried by the movable section, and pinions carried by the stationary section and operatively connecting said gears.

5. A variable direction propelling apparatus comprising, a housing including a movable section and a stationary section, an outrigger for supporting the stationary section, a driving shaft rotatably supported on the stationary section, a propeller shaft journaled in the movable section and operatively connected to the driving shaft, a second shaft journaled in the stationary section and in the outrigger, means operatively connecting the second shaft with the movable section to effect rotation of the latter upon rotation of the shaft, and an actuating shaft operatively connected to the second shaft for effecting rotation of the latter.

6. A variable direction propelling apparatus comprising, an outrigger, a housing including a stationary section fixed to the outrigger and a movable section rotatably mounted upon the stationary section and removable therefrom, a propeller shaft journaled in the movable section, a driving shaft journaled in the stationary section and operatively connected to the propeller shaft, a third shaft journaled in the stationary section and operatively connected to the movable section to effect rotation of the latter about the driving shaft as an axis, and means for actuating the third shaft.

7. A variable direction propelling apparatus comprising, a housing including a stationary section and a movable section rotatably mounted and removably associated with the stationary section, a propeller shaft journaled in the movable section, a driving shaft journaled in the stationary section and operatively connected to the propeller shaft, a third shaft journaled in the stationary section, and means interposed between the sections and operatively connecting the movable section with the third shaft to effect rotation of the former when the latter is rotated.

8. A variable direction propelling apparatus comprising, an outrigger, a housing including a stationary section detachably secured to the outrigger and a movable section rotatably mounted on and detachably associated with the stationary section, a propeller shaft journaled in the movable section, means journaled in the stationary section and interposed between the two sections for effecting rotation of the movable section, and means journaled in the stationary section for driving said propeller shaft irrespective of the position of the movable section.

9. A variable direction propelling apparatus comprising, an outrigger of conical form, a housing sustained by the small end of the outrigger and including a stationary section detachably secured to the outrigger and a movable section rotatable on and detachably associated with the stationary section, a propeller shaft journaled in the movable section, a journal box supported within the outrigger between its ends, a second shaft journaled in said journal box and in said stationary section, means for operatively connecting the second shaft with the movable section to effect rotation of the latter upon rotation of said shaft, an axle mounted within the second shaft, and a driving shaft journaled in said axle and operatively connected to the propeller shaft.

10. In combination, an air vehicle body, an outrigger secured to and extending laterally from the body, a housing including a stationary section secured to the outrigger and a movable section rotatably mounted upon the stationary section, a tubular shaft journaled in the stationary section, said outrigger, and said body, a tubular axle loosely fitted within said shaft, a propeller shaft journaled in and removable from the movable housing, a driving shaft journaled in said axle and operatively connected to the propeller shaft, and an actuating shaft supported within the body and disposed at right angles to the first shaft, means for operatively connecting the actuating shaft with the first shaft, and mechanism for operatively connecting the first shaft with the movable section to effect rotation of the latter upon rotation of the actuating shaft.

ROBERT STUART HEDTLER.
MILAN RANSFORD TAYLOR.